March 21, 1961 C. E. BACON ET AL 2,975,503
GLASS FABRIC REINFORCEMENT FOR PLASTICS
Filed Aug. 11, 1958

INVENTORS
CLARE E. BACON & MATTHEW T. NEMEYER
BY
ATTORNEYS

United States Patent Office 2,975,503
Patented Mar. 21, 1961

2,975,503

GLASS FABRIC REINFORCEMENT FOR PLASTICS

Clare E. Bacon, Darien, Conn., and Matthew T. Nemeyer, East Chester, N.Y., assignors to Owens-Corning Fiberglas Corporation, a corporation of Delaware Filed Aug. 11, 1958, Ser. No. 754,203

7 Claims. (Cl. 28—78)

This invention relates to fibrous glass for combining with plastics, usually of the thermosetting type, in laminated or molded structures for increasing the mechanical strength, stiffness, impact resistance, dimensional stability, and temperature endurance thereof.

More particularly this invention pertains to a preferably woven fabric of fibrous glass adaptable for reinforcement of plastic products shaped, at least in part, with curves or shoulders or which are otherwise irregular in contour.

Glass fabrics as associated in strengthening correlation with plastics may be preloaded with an uncured plastic resin before being positioned within the mold or may be laid in place in dry form superimposed over a resin layer, interposed between resinous layers, or with the resin added subsequently in a powdered or fluid state.

The characteristics desired in such glass reinforcements include strength, drapability, ease of wetting, facile release of air, capacity for coherent attachment to the plastic, extensibility, and competence to contribute to the smooth decorative appearance of the finished product.

The various forms of fibrous glass utilized for the reinforcement of plastics are generally derived from a base of continuous filaments. These are produced by the mechanical drawing and attenuation into fine fibers of minute streams of molten glass issuing from ported bushings which depend from the forehearth of a glass tank furnace.

A large number, ranging usually from one to four hundred, of the filaments are produced simultaneously from adjacent bushings and are gathered together into a single strand. To prevent abrading action between filaments and to bond them together in the strand a sizing material is applied during the gathering action. The sizing may consist of a starch and oil medium.

The strand may then be twisted and doubled and thus transformed to yarn from which cloth is woven. Alternately the strand may be directly chopped into short lengths or wound with others into roving which is subsequently cut into similar short sections. This decimated strand material is ordinarily relegated to the building of preforms and mats, or added to plastic resins in the preparation of pre-mixed molding compounds.

Woven cloths are utilized almost entirely in lay-up work and where maximum physical properties are more important than cost. In positioning and fitting the woven fabric within a mold considerable care and time must be taken to avoid creasing, overlapping of pieces, bridging of cavities and in pulling the cloth over convex surfaces. Since their qualities of drapability and give are limited in scope these fabrics are not feasible in many cases involving intricate shapes and must be elaborately tailored with wasteful trimming in many others.

Glass fabrics with a plain square weave have some stretching capacity while a satin weave is better from a draping standpoint. In the plain weave the yarn has a maximum amount of crimp or kinking with each warp and fill alternately passing under or over each crossing yarn. The straightening of the crimp contributes to the stretching faculty of this weave but the high quantity of crimp also lowers compression strength.

Preforms are shaped masses of fibrous glass prepared before the molding operation in order to have the fibrous glass reinforcement established beforehand in the configuration it must have in the final product. In molding articles incorporating hard curves or deep depressions the use of preforms is either the only possible method or replaces tedious and lay-up of tailored pieces of flat fibrous mat or fabric.

In the preform technique the cut strands are directed by air flow upon a shaped porous screen and a binder is applied to the collected mass of fibers to hold them in the conformation of the screen. About five percent by weight of binder is usually sufficient to effect the required bond. A wide range of materials are suitable as binders and include polystyrene, polyvinyl acetate, starch, dextrine and urea resins. After a short cure on the screen the integrated assembly of fibers is ready for detachment and insertion in the mold.

Preforms lend themselves to fast molding cycles as they may be quickly loaded into the mold. However their preparation is expensive and they are subject to breaking and shifting during the molding operation.

For purposes of this invention the strand of glass filaments, instead of being chopped into short lengths, assembled with other strands as rovings, or twisted and joined with other strands to produce yarn, is doubled back and forth upon itself in courses terminating in loops with each course overlying a high multiplicity of other courses and with each course slightly offset longitudinally of the course laid immediately ahead of it.

The endless, loose assembly thus created is a pseudo-roving which appears on examination of a limited portion to be composed of a large number of separate strands. The number of plies may run between twenty to several hundred but in preferred forms would have between forty and eighty concurrent stretches of strand. Such an elongated gathering of a strand may for example be built from successive courses, which are three inches in length terminating in loops, with each course over-reaching the preceding course an average distance of one twentieth of an inch, and with sixty strand ends in a cross section.

Equipment for producing this type of pseudo-roving may include a strand guiding arm swinging back and forth above and in line with a slowly moving conveyor of V section. Alternately, a circling guiding device may lay the strand in overlapping coils within a concave centering strip of a conveyor. The progressing series of stacked coils or of the looped courses thus created is consolidated in cylindrical form by being pulled by a pair of rollers through a funnel. In this gathering process the individual coils are flattened into parallel runs of strands with terminal loops. The sizing applied to the filaments is present in sufficient quantity to help hold the assembly in coherent relation.

The collecting funnel may have some internal spiral threading to give the straight strand elements of the consolidated body a slightly angled positioning instead of a distinct strata arrangement which the successive strand runs would otherwise be inclined to assume.

Other devices such as modified versions of those shown in U.S. Patents Nos. 2,719,350 and 2,719,352 issued to G. Slayter et al. are capable of utilization in creating these roving-like bodies. More of a twist and in some cases an entangling engagement between adjacent runs of strand is given the products by these mechanisms. If the commingling of the strand courses is not extreme enough to cause knotting, such interengagement is not objectionable from the standpoint of this invention. However shorter runs of strand between loops than those apparently created by the disclosures of these patents would be generally required for this invention.

Also, the amount of twist in the strand bundles resulting from the procedures described is believed more severe than that desirable for purposes of this invention.

The looped aggregations disclosed in the above identified patents constitute an arrangement for handling and packaging strand produced at an otherwise unmanageable, high rate and which it is intended to cut into short lengths for incorporation in preforms or in pre-mixed glass and resin molding compounds.

Because of the unbound array of short sections in these folded strand aggregations they entirely lack overall tensile strength and have not been considered a feasible component in woven glass fabrics for plastics reinforcement. With intermittent knots and snarls they may be elongated to many times their original length. Then, too, where twisted and entangled to an appreciable degree the sections between loops may variously extend more circumferentially than longitudinally of the aggregated body and thus further heighten the effect of low linear integrity.

The easy extensibility of these pseudo-rovings which has been one cause of the low regard in which they have been held is a quality found highly valuable in this invention in connection with somewhat modified forms of this type of roving. Paradoxically, the multiple loops which permit this ordinarily excessive elongation are themselves utilized to completely eliminate the propensity of the strand assembly to stretch, but only after this trait has served its purpose. This eradication of the extensible quality is accomplished by the filling of the loops with plastic in the molding operation and thus finally securing the individual runs of strands in solidly anchored position in which their full strength potential becomes effective.

Because of the high tensile strength of the glass fibers and their low maximum elongation, estimated at three percent, there is a limit on the low side in the size of the loops formed in turns of the strand, with the diameter of and the number of filaments being secondary determining factors. When there is a twist in the strand, the helical orientation of the filaments disposes a greater length of the filaments in a unit length of the strand and thus permits a sharper bend in the strand before the breaking point of the filaments is reached.

On the basis of incomplete data, it may be rather arbitrarily considered that a glass fiber will fracture when turned in an arc having a radius not greater than twenty times the diameter of the fiber. It follows that a strand should not be looped at any smaller radius than the allowable turn of its component filaments. However, this arc or loop size in reference to the diameter of the strand resides within a reasonable and practical area when the higher of the standard numbers of filaments in a strand are utilized. Accordingly, on the basis of known and calculated characteristics of glass fibers at the present time commercially available no fewer than one hundred and fifty filaments should be contained in strands intended for practice of this invention.

Supported by the high tensile strength of the basic filaments, the small loops in the strands of the prescribed specifications maintain themselves against the compacting forces of the weaving and molding procedures. This surprising faculty, contrary to normal expectations and to the behavior of other textile fibers is an essential factor in the execution of this invention. Observation of their continued existence and recognition of their anchoring capacity were essential factors in the conception of this invention.

It is concluded, in regard to a strand assembly of selected character (and performance tends to confirm the conclusion) that the size of these loops approach a rather ideal proportion in which the diameter of the open area circumscribed is roughly double the diameter of the strand. The merit of such a relationship is substantiated by its being the same as that between the dimensions of loop and ring seizings and the diameter of the rope of which they are formed in long tested nautical fastenings.

In following the precepts of this invention the pseudo-rovings are woven into fabrics or assembled and adhered together in an unwoven scrim formation. Generally the weave may be plain, satin or unidirectional and under some circumstances it may be desirable to use a conventional fibrous glass yarn or roving for either the warp or the fill of the woven cloth. In the event a tight weave is preferred, the pseudo-roving should be made sufficiently rugged by suitable sizing to bear the heavier weaving pulls and stresses. This sizing is subsequently removed from the completed cloth by heating or chemical washing to restore the unattached association of the parallel courses of the strand.

As is the conventional practice in connection with regular woven textiles of fibrous glass intended for plastics reinforcement, a finishing material of a different composition than the sizing is applied to fabrics incorporating pseudo-rovings according to this invention. These finishes are designed to increase the wettability by the resin of the fibrous glass and to improve the adhesion and union of the two components. A finishing material at present in common use is composed of methacrylato chromic choride and sold under the trademark "Volan." This is applied by a dip process and has been found suitable when either polyester or epoxy resins are involved in the molding operation. Silane finishing compounds such as vinyl trichlorosilane are also effective in creating the desired bond between the glass and resin elements.

It is the principal purpose of this invention to provide a glass fabric which not only has high reinforcing strength but also has a greatly improved quality of extensibility and which may accordingly be employed without the laborious tailoring and fitting found necessary in the past in the lay-up of fibrous glass fabrics in the molding of products of deeply drawn, curved or intricate shape.

A kindred object of the invention is the provision of a reinforcing fabric which may be substituted in many instances for expensive preforms.

A collateral object of the invention is to provide a fibrous glass fabric which will accommodate itself to the forming action of the mold with reduced tendency to rip, crease, wrinkle, and ribbon.

A further object is to provide a fabric in which each course of strand in a warp or fill of multiple strand construction terminates at both ends in an open loop formation by which the strand may be firmly anchored in the molded product by the entry and setting of the plastic resin therein.

These and other objects and advantages of the invention and manner of attainment thereof are brought out more fully in the following description in conjunction with the drawings in which.

Figure 1:
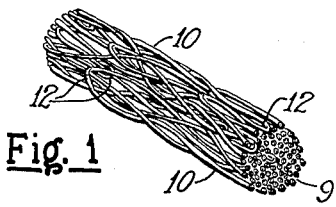
Figure 1 is a perspective view of a section of a pseudo-roving as employed in this invention.

Referring to the drawings in more detail the section of the roving-simulating body depicted in Figure 1 is composed of numerous runs of the basic strand as may be seen at the cut end 9. Individual courses of the strand are indicated at 10 with each course terminating in loops 12.

Figure 2:
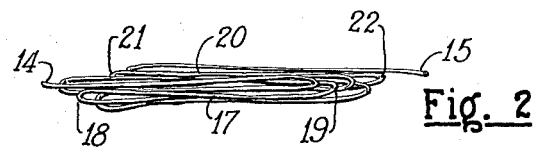
Figure 2 is a somewhat diagrammatic showing of a strand of fibrous glass folded back and forth in multiple, overlying courses in a manner by which the roving-like body of Figure 1 may be created.
Figure 3:
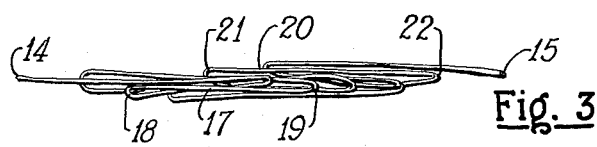
Figure 3 is an illustration of the assembly of Figure 2 indicating the relative shortening of the individual courses of strand between loops following elongation of the assembly.

In order that the arrangement of the series of courses in a pseudo-roving here involved may be better understood an assembly of a compartively small number of the courses in an advancing series is illustrated rather diagrammatically in Figures 2 and 3. These may be considered as the beginning of a continuous body of a repeatedly looped strand as built by a reciprocating strand guiding arm over a slowly moving conveyor, or more simply a manually arranged multiple looping of a strand.

The starting end of the strand is indicated at 14 with the end 15 being the source end here shown severed from the normally continuous supply. One of the strand runs 17 terminates in loops 18 and 19 while another run 20 has end loops 21 and 22. Figure 3 illustrates the reduced lengths of runs 17 and 20 and the closer positioning of loops 18 and 19, and loops 21 and 22 as typical of the alterations in the grouping when the pseudo-roving undergoes elongation. Because of the high number of plies or individual strand runs and the rather uniform relationship between them the yielding of the assembly under tension is distributed evenly, longitudinally thereof.

Figure 4:
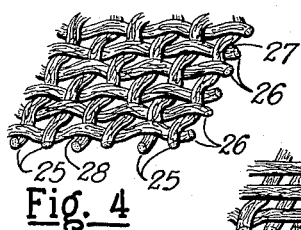
Figure 4 is a broken, perspective view of a fabric utilizing pseudo-rovings in a plain, square weave.

A fabric with a plain weave as illustrated in Figure 4 may be prepared from the pseudo-rovings. This has the same number of warp ends 25 as fill picks 26 and, for uniformity in the strength pattern, the warp and fill rovings are of identical gauge. Due to the top quantity of crimp 27 and 28 there is some basic stretch in this weave but even so this type of cloth has been fairly well limited to reinforcement of generally flat areas. If held too tautly conventional yarns in a plain weave are apt to ribbonize or flatten out and in this deformed state slow the escape of air caught beneath the fabric in the molding operation.

The easy extensibility of the roving bodies employed in this invention not only permits a plain woven fabric to be fitted to an angular contour but also makes it less inclined to restrain air evacuation. By conforming easily to various configurations, a cloth fabricated under the teachings of this invention need not be cut into numerous tailored sections.

Figure 5:
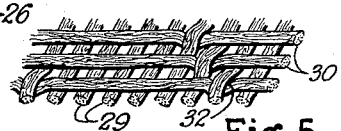
Figure 5 is a similar showing of a fabric having a satin weave.
Figure 6:
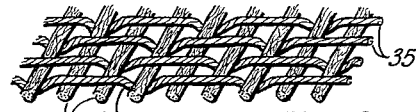
Figure 6 is a perspective view of a fabric incorporating the special rovings of this invention in a unidirectional weave.

A fabric having a satin weave as illustrated in Figure 5 is preferred in practicing this invention due to its inherent draping capacity. Also as the warp and fill rovings 29 and 30 only turn over or under every seventh cross yarn there is a paucity of crimps to interfere with stretching of the rovings, and there is a maximum of straight sections of the rovings which contributes to greater final tensile strength.

Where stretch across only one dimension is necessary in order for the cloth reinforcement to acocmmodate itself to the curvatures of the molded product the fill yarn may be a conventional, non-extensible yarn or roving. Where strength also is required only in the direction of stretch the fill may be of light stock. A fabric so constructed is pictured in Figure 6 having sturdy pseudo-rovings 34 as warp and comparative weak cross fill members 35. These are here combined in a twill weave with spaced crimpings 36. There may be cases where an extensible roving of the subject design may be used to advantage as a fill yarn to permit spreading of a heavier warp yarn of conventional non-stretching structure.

Figure 7:
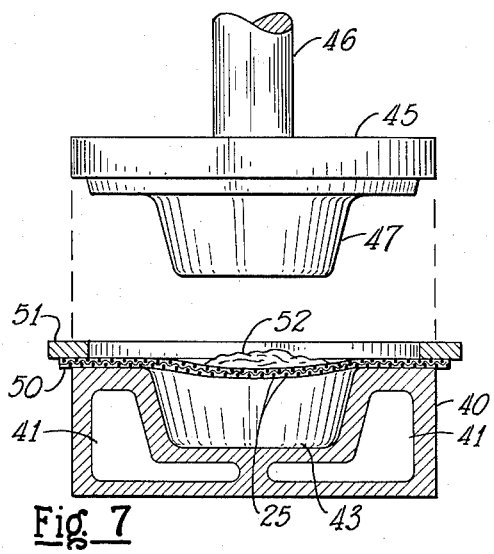
Figure 7 is an elevational view, partly in section, of a mold in open position and a reinforcing fabric fashioned according to this invention in position to be formed.
Figure 8:
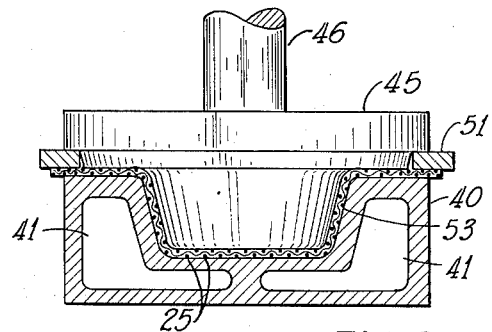
Figure 8 is a like view of the mold of Figure 7 in closed position.

The behavior of a reinforcing fabric of this invention in a molding cycle is portrayed in Figures 7 and 8. The female part or die 40 is cored at 41 for curing steam and has the shaping cavity 43. The upper press member 45 is supported upon ram 46 and has the depending male punch 47. The fibrous glass reinforcing fabric 50 has a plain weave comparable to that depicted in Figure 4. After its placement in the mold the fabric is held by a retaining ring 51. If the fabric is not carrying an impregnation of uncured plastic resin this component may be added in powdered or fluid form as indicated at 52.

The most widely used plastic resins have been the polyesters. Other resins having suitable attributes include epoxy, phenolic, melamine and silicone. In addition to these, which are thermosetting, there are several thermoplastic resins, such as polystyrene, which may feasibly be molded with fibrous glass reinforcements.

Upon closing of the mold the warp and fill rovings are elongated to extend over the increased area represented by the contour of the mold and in this action the ends of warp and fill are spread apart as shown by comparing the positioning of the adjacent warp ends 25 in Figures 7 and 8. The plastic resin is forced into the fabric by the molding pressure and is permanently set by the curing heat of steam in cored chambers 41 in the lower mold part and in like chambers as commonly provided in the male half of the mold.

The strong self perpetuating power of the open loops in a size particularly well suited for their anchoring function holds them ready for receiving the fluid resin in the molding procedure. They thus become filled with hardened plastic and firmly establish the courses of the strands running between them as tough, enduring sinews.

The length of the loop terminated courses of strand in the built up roving should of course be much shorter than the dimension of the molded part which the fabric is to span. For quite large products the length of the individual runs may be five inches or more. For parts having widthes of eight to ten inches, for example, the runs should be between one and two inches for best results. By having such reduced lengths, the clamping of the fabric at the edge of the mold will have less deterring effect on the extensibility of the fabric in areas adjoining the fixed border, and there will be less binding contact between adjacent strand runs to oppose movement therein during elongation.

While the separate runs of strand in a particular pseudo-roving would ordinarily be quite uniform in length, there would be no objection and possibly some benefit in having the lengths vary within a moderate range. This variation could be secured by arranging a slight irregularity in the operation of the loop creating mechanism.

In contact molding the fabric of this invention is manually stretched and turned to follow the contours of the mold. As the slipping of strand sections past each other under extension of the fabric is under no elastic reistance which would incline the fabric to return to its original state, the fabric will remain in its manipulated arrangement conforming to the shape of the mold. This manual fitting of the fabric reinforcement may also be employed advantageously in vacuum bag, and flexible plunger molding processes.

As previously discussed, glass fibers, and the yarns and rovings into which they are gathered, may only take a limited bend or loop because of the low limit of elongation of the basic fiber. Tests have demonstrated that natural fibers may be turned at an extreme angle of 180 degrees without fracture while glass fibers consistently break long before reaching such an abrupt bend. This low elongating property in conjunction with the resisting strength of the fibers maintains an ample open area within the loops which may be formed in the strands of the pseudo-rovings of this invention. If the basic filaments are moderately fine and combined in a fairly high quantity in the strand, the loops will be of a size small enough to survive but open enough to act most effectively in this invention through the entry and hardening of the plastic resin within the loops.

The stresses which the pseudo-rovings endure in formation and weaving are not normally sufficient to force the loops to a breaking point. With the plastic hardened within the loops in the molding process the loops are firmly established in their safe, reasonable curves and for this reason are not subject to tightening and crushing when tension is applied to the strand sections of the roving as the reinforced molded product is put under working stresses.

The fabrics of this invention may be used in layers to build a greater thickness without seriously affecting their unique qualities. They may also be supplemented in fairly flat areas by non-extensible mats and fabrics, for strengthening or decorative purposes. Instead of being placed unshaped in fast operating matched die molding, the subject fabrics may first be made into preforms, to insure improved products under some circumstances. Rovings of this invention may also be adhered together in unwoven scrim fabric with the adhesive soluble in the plastic resin to release the extensibility of these special rovings in the molding operation.

While a single strand has been described herein as the base of the roving-like bodies, there is no reason why several strands may not be looped back and forth together to build this product. Similarly two or more of the rovings may be combined with a slight twist to form an extensible yarn.

Discussion herein of the various fiber sizings, fabric finishing compositions, fabric weaves, and plastic resin formulations has been purposely brief as many different types are available and well known in the plastic molding industry. Judgment of their qualifications in connection with fibrous glass elements intended for the practice of this invention would ordinarily follow the same reasoning as in their selection for creating conventional fibrous glass reinforcements. In each situation the compatibility, the particular qualities and the amount of each substance must be considered.

In regard to filament diameters, sizes of twenty hundred thousandths of an inch or lower (down to ten, hundred thousandths) are considered highly desirable but not essential. A content of three or four hundred filaments in a strand will perform excellently and is recommended. A higher number of filaments, preferably filaments of small diameter for reduction of bulk, should be quite as satisfactory. A strand composed of fewer than two hundred filaments is held objectionable with a decrease much below that figure as hardly workable.

In summary, it is believed clear that methods and products have been presented herein for enabling others acquainted with the art to competently follow the precepts of the invention and to reap the benefits thereof according to the earlier recited objects.

It is further believed that the development of the subject methods and products, wherein a quality of supposed weakness has been converted to a function of great value and structural elements responsible for this questionable quality have been transformed to agents of special strength, possesses characteristics most strongly indicative of the presence of invention.

We claim:

1. An extensible fabric of fibrous glass for reinforcement of molded plastics in which there is a set of wrap yarns and a set of fill yarns, and the yarns of one of the two sets are extensible being composed of generally longitudinally extending, and progressively overlapping courses of strands of glass filaments with each course terminating in open loops, the overlapping courses of strands being longitudinally and relatively displaceable under mold conforming pressure applied to the fabric, and said open loops being adapted to receive plastic and thereby act to hold said courses against longitudinal displacement.

2. An extensible fabric of fibrous glass according to claim 1 in which there are between forty and eighty concurrent courses of strand in said yarns.

3. An extensible fabric of fibrous glass according to claim 1 in which there are at least two hundred filaments in said strands.

4. An extensible fabric of fibrous glass according to claim 3 in which the filaments have diameters between ten and twenty, hundred thousandths of an inch.

5. An extensible fabric of fibrous glass according to claim 1 in which the courses of strands are between one and five inches in length.

6. An extensible fabric of fibrous glass according to claim 1 in which the other set of yarns is of a non-extensible character.

7. An extensible fabric of fibrous glass according to claim 1 in which both sets of yarns are extensible.

References Cited in the file of this patent

UNITED STATES PATENTS

| | | |
|---|---|---|
| 2,719,350 | Slayter et al. | Oct. 4, 1955 |
| 2,719,352 | Slayter et al. | Oct. 4, 1955 |